US012668152B2

(12) United States Patent
Yi et al.

(10) Patent No.:  US 12,668,152 B2
(45) Date of Patent:       Jun. 30, 2026

(54) METHOD FOR DISCHARGING PLURALITY OF BATTERIES INCLUDED IN MOBILE ROBOT, AND MOBILE ROBOT

(71) Applicant: LG ELECTRONICS INC., Seoul (KR)

(72) Inventors: Sang Kyu Yi, Seoul (KR); Byung Kon Sohn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 310 days.

(21) Appl. No.: 18/269,613

(22) PCT Filed: Jul. 27, 2021

(86) PCT No.: PCT/KR2021/009711
  § 371 (c)(1),
  (2) Date: Jun. 26, 2023

(87) PCT Pub. No.: WO2022/169044
  PCT Pub. Date: Aug. 11, 2022

(65) Prior Publication Data
  US 2024/0059186 A1      Feb. 22, 2024

(30) Foreign Application Priority Data

Feb. 4, 2021    (KR) ........................ 10-2021-0016054

(51) Int. Cl.
  B60L 58/18          (2019.01)
  B60L 58/12          (2019.01)
(52) U.S. Cl.
  CPC .............. B60L 58/18 (2019.02); B60L 58/12 (2019.02)
(58) Field of Classification Search
  None
  See application file for complete search history.

(56) References Cited

U.S. PATENT DOCUMENTS 9,350,177 B2 *   5/2016  Ohmori ............. H02J 7/007194
9,837,834 B2 *  12/2017  Sugiyama ........... H02J 7/00714
                    (Continued)

FOREIGN PATENT DOCUMENTS

CN        103828178        5/2014
CN        107743674        2/2018
                    (Continued)

OTHER PUBLICATIONS

Machine translation of KR 20050063539 (Year: 2005).*
                    (Continued)

*Primary Examiner* — James J Lee
*Assistant Examiner* — David Hatch
(74) *Attorney, Agent, or Firm* — KED & ASSOCIATES

(57)          ABSTRACT

Provided are a method for discharging a first battery and a second battery included in a mobile robot, the method including determining that the mobile robot is to begin driving, determining which of a plurality of predetermined intervals a charge amount of the first battery and a charge amount of the second battery at a time point of the determination fall within, respectively, determining an interval to discharge the first battery based on which intervals the charge amount of the first battery and the charge amount of the second battery fall within, and performing a switching operation to begin discharging of the second battery after the first battery has completed discharging in the determined interval, a mobile robot performing the method, and a computer-readable recording medium having a computer program for executing the method stored thereon.

20 Claims, 11 Drawing Sheets

(56)                    References Cited

U.S. PATENT DOCUMENTS

| | | | | |
|---|---|---|---|---|
| 9,960,458 | B2 * | 5/2018 | Weicker | H02J 7/34 |
| 10,591,979 | B2 * | 3/2020 | Kacker | G06F 1/263 |
| 11,196,101 | B2 * | 12/2021 | Yamada | H02J 7/00712 |
| 2005/0234595 | A1 | 10/2005 | Tani | |
| 2008/0109114 | A1 | 5/2008 | Orita et al. | |
| 2015/0042284 | A1 | 2/2015 | Murata | |
| 2021/0060801 | A1 | 3/2021 | Kwak et al. | |

FOREIGN PATENT DOCUMENTS

| | | |
|---|---|---|
| CN | 111993953 | 11/2020 |
| JP | H06-044305 | 6/1994 |
| JP | H07-163015 | 6/1995 |
| JP | 2513306 | 7/1996 |
| JP | 2005-304546 | 11/2005 |
| JP | 2006-106919 | 4/2006 |
| JP | 2009-240154 | 10/2009 |
| JP | 2016-220824 | 12/2016 |
| KR | 10-1999-0081580 | 11/1999 |
| KR | 10-2005-0063539 | 6/2005 |
| KR | 10-2008-0000390 | 1/2008 |
| KR | 10-2006-0104006 | 4/2008 |
| KR | 10-2019-0106864 | 9/2019 |
| TW | I599139 | 9/2017 |
| WO | WO 2016/189915 | 12/2016 |

OTHER PUBLICATIONS

Japanese Office Action dated Jul. 17, 2024 issued in Application No. 2023-545243.

International Search Report dated Oct. 25, 2021 issued in Application No. PCT/KR2021/009711.

Chinese Notice of Allowance issued in Application No. 202180092336.3 dated Nov. 21, 2025.

Chinese Office Action dated Jul. 21, 2025 issued in Application No. 202180092336.3.

\* cited by examiner

METHOD FOR DISCHARGING PLURALITY OF BATTERIES INCLUDED IN MOBILE ROBOT, AND MOBILE ROBOT

CROSS-REFERENCE TO RELATED PATENT APPLICATIONS

This application is a U.S. National Stage Application under 35 U.S.C. § 371 of PCT Application No. PCT/KR2021/009711, filed Jul. 27, 2021, which claims priority to Korean Patent Application No. 10-2021-0016054, filed Feb. 4, 2021, whose entire disclosures are hereby incorporated by reference.

TECHNICAL FIELD

This disclosure relates to a method for discharging a plurality of batteries included in a mobile robot, and a mobile robot using the same.

BACKGROUND ART

Robots are built and operated in a variety of industries, including medical, aerospace, shipbuilding, and agriculture. In recent years, robot control and fabrication technologies have evolved to allow robots to be used in the home to perform specific tasks. Examples of household robots include robot vacuum cleaners, lawn mower robots, and the like, and those household robots perform tasks based on user instructions. In this way, the robot may be controlled to perform prescribed tasks set in advance while moving around by itself.

For example, a robot vacuum cleaner, which is commonly used as a household mobile robot, is a device that drives itself through a prescribed area without a user's operation and cleans by sucking up dust and other foreign substances in the prescribed area or mopping up foreign substances on the floor. A mobile robot as a robot vacuum cleaner can detect obstacles installed in the area and perform operations by approaching or avoiding the obstacles to efficiently drive through the area and perform cleaning. In addition to this, commercial mobile robots for performing tasks in a wide range of areas can perform prescribed tasks while traveling.

These mobile robots are usually not wired but equipped with rechargeable batteries, which allows them to operate wirelessly. These rechargeable batteries, also known as secondary batteries, are therefore subject to a charging and discharging process. Depending on the environment in which these mobile robots perform their prescribed tasks, at least one battery may be mounted on the mobile robot. In particular, commercial robots may utilize multiple batteries because they clean larger areas than household robots and therefore require longer operating times, and situations may arise in which such mobile robots need to use batteries with different levels of remaining charge.

The prior art devises methods for efficiently utilizing only a single battery used in a mobile robot, or simply proposes techniques for selecting a battery for use based on the output voltage of the battery.

As a prior art, Japanese Patent Laid-open Publication No. 2016-220824 discloses a technique for selecting a battery to be used as an operating power source based on information about the batteries to solve problems such as poor operation due to voltage fluctuations that may occur when the remaining charge (output voltage) of a rechargeable battery is changed upon switching between multiple batteries during automatic driving. However, this prior art simply proposes a technology to select a battery to be used based on information obtained from the batteries, but does not propose a means to secure the maximum operation time of the mobile robot in a prescribed mode desired by the user by performing a specific discharge scenario that the mobile robot can perform using a plurality of batteries.

As another prior art, Korean Patent Laid-open Publication No. 10-2006-0104006 proposes a method of returning to a prescribed location when the battery output voltage decreases below a prescribed level of voltage after starting cleaning based on voltage information obtained from a single battery. However, this prior art only describes how to operate the mobile robot in the process of using a single battery, and does not propose a means of securing operation time through a discharge scenario between multiple batteries.

DISCLOSURE OF INVENTION

Technical Goals

When a mobile robot is equipped with multiple batteries, the discharging process of the batteries may cause differences in the charge amount of each battery, so a strategy for discharging multiple batteries is needed to ensure efficient discharge of the batteries.

Furthermore, considering the issue of complete discharge of the batteries that may occur in the process of using the batteries mounted on the mobile robot, there is a need to prevent a complete discharge of multiple batteries included in the mobile robot by establishing a discharge scenario utilizing the multiple batteries in advance so that the mobile robot can perform an effective discharge scenario in view of the charge amounts of the multiple batteries. For example, if the residual charge amount of the batteries is reduced to a predetermined level or less after normal operation of the mobile robot, only enough charge amount may be required for the mobile robot to enter a sleep mode, and maintaining the charge amount required for such a sleep mode as much as possible prevents the batteries from being completely discharged, thereby preventing the life of the batteries from rapidly decreasing. Therefore, a discharge scenario between multiple batteries of the mobile robot that allows the batteries to be maintained at a charge amount suitable for the sleep mode for the longest possible time may be an important technical aspect for increasing the life of the batteries of the mobile robot.

Technical Solutions

According to an aspect, there is provided a method for discharging a first battery and a second battery included in a mobile robot, the method including determining that the mobile robot is to begin driving, determining which of a plurality of predetermined intervals a charge amount of the first battery and a charge amount of the second battery at a time point of the determination fall within, respectively, determining an interval to discharge the first battery based on which intervals the charge amount of the first battery and the charge amount of the second battery fall within, and performing a switching operation to begin discharging of the second battery after the first battery has completed discharging in the determined interval.

According to another aspect, there is also provided a mobile robot including a first battery, a second battery, and a processor configured to determine that the mobile robot is to begin driving, determine which of a plurality of predetermined intervals a charge amount of the first battery and a charge amount of the second battery at a time point of the determination fall within, respectively, determine an interval to discharge the first battery based on which intervals the charge amount of the first battery and the charge amount of the second battery fall within, and perform a switching operation to begin discharging of the second battery after the first battery has completed discharging in the determined interval.

According to yet another aspect, there is also provided a non-transitory computer-readable recording medium having a computer program for executing the method stored thereon.

Effects

According to example embodiments, it is possible to maximize the working time of the mobile robot and to secure enough operation time to return to the location from which the operation started.

According to the present disclosure, it is possible to secure the maximum operation time of the mobile robot by allowing all of the plurality of batteries to be consumed up to an unusable voltage during the standby time of the mobile robot.

According to the present disclosure, by preventing the batteries from being completely discharged due to the operation of the mobile robot, the rate at which the life of the batteries is reduced through repeated charging and discharging is effectively reduced.

BEST MODE FOR CARRYING OUT THE INVENTION

Figure 1:
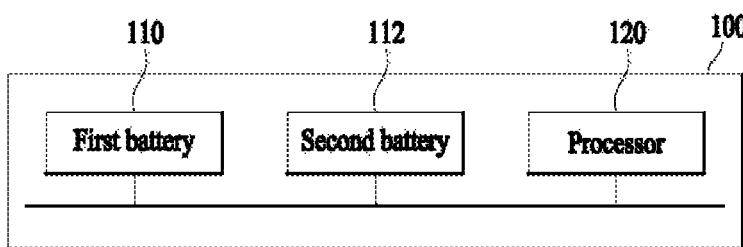
FIG. 1 is a block diagram illustrating a mobile robot, according to an example embodiment.

According to an example embodiment, a method for discharging a first battery and a second battery included in a mobile robot may be provided, in which the method includes determining that the mobile robot is to begin driving, determining which of a plurality of predetermined intervals a charge amount of the first battery and a charge amount of the second battery at a time point of the determination fall within, respectively, determining an interval to discharge the first battery based on which intervals the charge amount of the first battery and the charge amount of the second battery fall within, and performing a switching operation to begin discharging of the second battery after the first battery has completed discharging in the determined interval.

According to an example embodiment, the method may be provided in which the first battery is a battery predetermined to be discharged first.

According to an example embodiment, the method may be provided in which the plurality of predetermined intervals comprises at least one of a normal operation interval, a return operation interval corresponding to a charge amount to return to a predetermined location, and a sleep interval, the predetermined location is a location where at least one of the first battery and the second battery was recently charged, and the mobile robot periodically performs, in the sleep operation interval, a wake-up operation using the first battery or the second battery according to a predetermined time interval and the switching operation to use a battery having a higher charge amount.

According to an example embodiment, the method may be provided in which an amplitude of the charge amount corresponding to each of the plurality of intervals is higher in the order of the normal operation interval, the return operation interval, and the sleep operation interval.

According to an example embodiment, the method may be provided in which determining the interval to discharge the first battery includes determining to discharge the first battery in the normal operation interval and the return operation interval when both the charge amount of the first battery and the charge amount of the second battery fall within the normal operation interval.

According to an example embodiment, the method may be provided in which determining the interval to discharge the first battery includes determining to discharge the first battery in the normal operation interval when the charge amount of the first battery falls within the normal operation interval and the charge amount of the second battery falls within the return operation interval.

According to an example embodiment, the method may be provided in which determining the interval to discharge the first battery includes determining to discharge the first battery in the return operation interval when the charge amount of the first battery falls within the return operation interval.

According to an example embodiment, the method further including determining to discharge the second battery until just before the sleep operation interval may be provided.

According to an example embodiment, the method further including periodically performing the wake-up operation at predetermined time intervals in the sleep operation interval when the second battery has been discharged until just before the return operation interval completely, determining which of the first battery and the second battery has a higher charge amount for each wake-up operation, and performing a switching operation for using the battery determined to have a higher charge amount may be provided.

According to an example embodiment, the method may be provided in which determining which of the plurality of predetermined intervals includes determining a battery to be used to perform a return operation for the mobile robot to return to a predetermined location based on which interval the charge amount of the first battery and the charge amount of the second battery fall within.

According to an example embodiment, the method may be provided in which determining the battery to be used to perform the return operation includes determining the second battery as the battery to be used to perform the return operation when both the charge amount of the first battery and the charge amount of the second battery fall within the normal operation interval.

According to an example embodiment, the method may be provided in which determining the battery to be used to perform the return operation includes determining the first battery as the battery to be used to perform the return operation when the charge amount of the first battery falls within the normal operation interval and the charge amount of the second battery falls within the return operation interval.

According to an example embodiment, the method may be provided in which determining the battery to be used to perform the return operation includes determining the second battery as the battery to be used to perform the return operation when the charge amount of the first battery falls within the return operation interval.

According to an example embodiment, a mobile robot including a first battery, a second battery, and a processor may be provided, and the processor may be configured to determine that the mobile robot is to begin driving, determine which of a plurality of predetermined intervals a charge amount of the first battery and a charge amount of the second battery at a time point of the determination fall within, respectively, determine an interval to discharge the first battery based on which intervals the charge amount of the first battery and the charge amount of the second battery fall within, and perform a switching operation to begin discharging of the second battery after the first battery has completed discharging in the determined interval.

According to an example embodiment, the mobile robot may be provided in which the processor is further configured to predetermine to discharge the first battery first.

According to an example embodiment, the mobile robot may be provided in which the plurality of predetermined intervals comprises at least one of a normal operation interval, a return operation interval corresponding to a charge amount to return to a predetermined location, and a sleep operation interval, the predetermined location is a location where at least one of the first battery and the second battery was recently charged, and the processor is further configured to periodically perform, in the sleep operation interval, a wake-up operation using the first battery or the second battery at predetermined time intervals and the switching operation to use a battery having a higher charge amount.

According to an example embodiment, the mobile robot may be provided in which the processor is further configured to determine to discharge the first battery in the normal operation interval and the return operation interval when both the charge amount of the first battery and the charge amount of the second battery fall within the normal operation interval.

According to an example embodiment, the mobile robot may be provided in which the processor is further configured to determine to discharge the first battery in the normal operation interval when the charge amount of the first battery falls within the normal operation interval and the charge amount of the second battery falls within the return operation interval.

According to an example embodiment, the mobile robot may be provided in which the processor is further configured to determine to discharge the first battery in the return operation interval when the charge amount of the first battery falls within the return operation interval.

According to an example embodiment, a non-transitory computer-readable recording medium having a computer program for executing the method stored thereon may be provided.

Hereinafter, implementations of the present disclosure will be described in detail with reference to the drawings so that those skilled in the art to which the present disclosure pertains can easily perform the present disclosure. The present disclosure may be implemented in many different forms and is not limited to the implementations described herein.

For brevity of description, a part that is not related to the description may be omitted, and the same or similar components are denoted by the same reference numerals throughout the specification. Further, some implementations of this application will be described in detail with reference to exemplary drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled" and "joined" between the first and second components, although the first component may be directly connected, coupled or joined to the second component.

In implementing the present disclosure, it will be further understood that the terms "comprise," "include" or "have" when used herein, specify the presence of stated features, integers, steps, operations, elements, and/or components, but do not preclude the presence or addition of one or more other features, integers, steps, operations, elements, components, and/or groups thereof.

Further, in implementing the present disclosure, for convenience of explanation, components may be described by being subdivided; however, these components may be implemented in a device or a module, or a single component may be implemented by being divided into a plurality of devices or modules.

FIG. 1 is a block diagram illustrating a mobile robot 100, according to an example embodiment.

According to an example embodiment, the mobile robot 100 may include a first battery 110, a second battery 112, and a processor 120 configured to determine that the mobile robot is to begin driving, determine which of a plurality of predetermined intervals the charge amount of the first battery 110 and the charge amount of the second battery 112 at the determined time fall within, respectively, determine an interval to discharge the first battery 110 based on which intervals the charge amount of the first battery 110 and the charge amount of the second battery 112 fall within, and perform a switching operation to begin discharging the second battery 112 after the first battery 110 has completed discharging in the determined interval.

According to an example embodiment, the number of batteries included in the mobile robot 100 is a plurality. However, for convenience in describing the switching operation between the plurality of batteries included in the mobile robot 100, the following description is based on the premise that various example embodiments of the present disclosure are implemented by the mobile robot 100 including the first battery 110 and the second battery 112. Therefore, the features of the present disclosure need not be limited to the case where the number of batteries included in the mobile robot 100 is two, and can be interpreted to include all various cases where a switching operation between a plurality of batteries is performed.

According to an example embodiment, the processor 120 of the mobile robot 100 may be configured to predetermine to discharge the first battery 110 first. By determining to first discharge the first battery 110, which is one of the plurality of batteries, the processor 120 may control that the first battery 110 begins discharging in preference to the other batteries, according to an example embodiment. Accordingly, if the remaining charge amount of the first battery 110 is at or above the level at which the mobile robot 100 is operable, the process of selecting which battery to discharge upon initial startup of the mobile robot 100 may be omitted because the first battery 110 will be discharged first, regardless of the charge amount of the other battery.

According to an example embodiment, determining the first battery 110 as being discharged first by the processor 120 may include predetermining the first battery 110 based on external input from a user. According to another example embodiment, determining the first battery 110 as being discharged first by the processor 120 may include predetermining the battery with the largest capacity of chargeable power among the plurality of batteries as the first battery 110. According to yet another example embodiment, determining the first battery 110 as being discharged first by the processor 120 may include predetermining the most recently replaced battery of the plurality of batteries as the first battery 110.

According to an example embodiment, the processor 120 may determine a plurality of intervals based on the charge amount and determine which of the plurality of intervals the charge amount of the first battery 110 and the charge amount of the second battery 112 fall within. According to an example embodiment, the plurality of intervals may be the same for the first battery 110 and the second battery 112, or may be different.

Hereinafter, a detailed process of performing a method for discharging the first battery 110 and the second battery 112 by the mobile robot 100 will be described.

Figure 2:
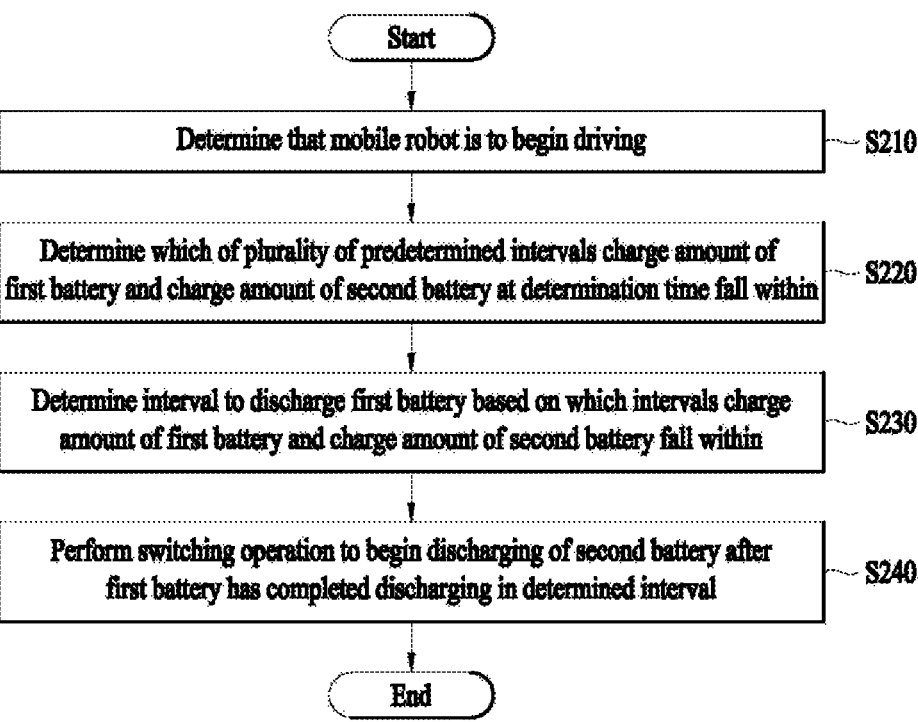
FIG. 2 is a flowchart of a method for discharging a first battery and a second battery of a mobile robot, according to an example embodiment.

FIG. 2 is a flowchart of a method for discharging the first battery 110 and the second battery 112 of the mobile robot 100, according to an example embodiment.

In operation S210, the processor 120 may determine that the mobile robot 100 is to begin driving, according to an example embodiment. According to an example embodiment, a time point at which the mobile robot 100 is to begin driving may be determined based on whether a condition is satisfied. According to an example embodiment, the method of the present disclosure may be performed based on a time point that the mobile robot 100 determines based on an external input from a user. According to an example embodiment, the method of the present disclosure may be performed based on a time point when the mobile robot 100 is determined to begin driving after the mobile robot 100 stops running because it is determined that the battery included in the mobile robot 100 needs to be replaced. However, the time point at which the mobile robot 100 is determined to begin driving need not be interpreted as being limited to the time point at which the mobile robot 100 is determined to begin driving after being stationary as in the above example embodiment, but can be broadly interpreted to include any time point at which the method of the present disclosure is determined to be performed by the processor 120.

In operation S220, the processor 120 may determine, according to an example embodiment, which of a plurality of predetermined intervals the charge amount of the first battery 110 and the charge amount of the second battery 112 at the time point determined in operation S210 fall within, respectively. According to an example embodiment, the processor 120 may determine the charge amounts based on output voltages of the first battery 110 and the second battery 112. The process of determining the charge amount of the battery may be implemented according to various techniques in the art.

According to an example embodiment, the plurality of intervals may include at least one of a normal operation interval, a return operation interval corresponding to the charge amount for returning to a predetermined location, and a sleep operation interval. According to an example embodiment, an amplitude of the charge amount corresponding to each of the plurality of intervals may be higher in the order of the normal operation interval, the return operation interval, and the sleep operation interval. However, the plurality of intervals set by the processor 120 need not be interpreted as being limited to the normal operation interval, the return operation interval, and the sleep operation interval as in the above example embodiment, but may be broadly interpreted as utilizing a plurality of charge intervals that may be set for any purpose based on the charge amounts of the plurality of batteries.

According to an example embodiment, the mobile robot 100 may perform operations that are set to be performed by the processor 120 during the normal operation interval. For example, if the mobile robot 100 is configured to perform cleaning operations as a robot vacuum cleaner, the processor 120 may control the operation of wheels, motors, suctions, and the like to allow the mobile robot 100 to perform cleaning while traveling normally. The operations set to be performed by the processor 120 during the normal operation interval may include various general operations according to the type of the mobile robot 100.

According to an example embodiment, the processor 120 may obtain information about an output voltage of the first battery 110 and the second battery 112 and an input voltage that is actually input to a driver. If the difference between the output voltage of the first battery 110 and the second battery 112 and the input voltage actually input to the driver is determined to be large, according to an example embodiment, the processor 120 may determine which of the plurality of predetermined intervals the charge amount of the first battery 110 and the charge amount of the second battery 112 fall within, respectively, based on the input voltage actually input to the driver.

According to an example embodiment, the normal operation interval may be divided into a plurality of sub-intervals, and the processor 120 may adjust the intensity of the normal operation based on the output voltage of the batteries for each sub-interval.

According to an example embodiment, the predetermined location to which the mobile robot 100 returns in the return operation interval may correspond to a location where at least one of the first battery and the second battery was recently charged.

According to an example embodiment, the predetermined location to which the mobile robot 100 returns in the return operation interval may be determined to be a location from which the cleaning was started using the first battery or the second battery.

According to an example embodiment, the processor 120 may further include additional configurations for determining the predetermined location. For example, the mobile robot 100 may further include an external signal detection sensor to determine the current location and the predetermined location, and the external signal detection sensor may include, for example, at least one of an infrared ray sensor, an ultrasonic sensor, a radio frequency sensor, a gyro sensor, a wheel sensor, an acceleration sensor, a movement volume sensing unit, a lidar (Light Detection and Ranging), a lens, an image sensor, a position sensitive detector (PSD) sensor, an optical flow sensor, a 3D depth camera, and a GPS. According to an example embodiment, the mobile robot 100 can return to the predetermined location by determining the absolute location information (e.g., GPS coordinates) of the mobile robot, as well as return to the predetermined location using a map generated by detecting surrounding objects.

According to an example embodiment, the mobile robot 100 may perform a wake-up operation using the first battery 110 or the second battery 112 in the sleep operation interval, and an operation to determine which battery to discharge periodically at predetermined time intervals. This will be described later with reference to various example embodiments.

In operation S230, the processor 120 may determine an interval to discharge the first battery 110 based on which interval the charge amount of the first battery 110 and the charge amount of the second battery 112 fall within, according to an example embodiment.

According to an example embodiment, the processor 120 may determine to what extent to discharge the first battery 110 or the second battery 112 based on the charge amounts of the first battery 110 and the second battery 112 (that is, based on which interval it falls within among a plurality of intervals predetermined based on the charge amount). If it is determined to discharge the first battery 110 according to an example embodiment, the processor 120 may determine for which interval to discharge the first battery 110 based on a combination of the charge amounts of the first battery 110 and the second battery 112.

In operation S240, the processor 120 may perform a switching operation to begin discharging of the second battery 112 after the first battery has completed discharging for the interval determined in operation S230. According to an example embodiment, the processor 120 may be configured to trigger the switching operation as the determined interval to discharge the first battery 110 is passed, and may be configured to begin discharging of the second battery 112 from the time triggered.

According to an example embodiment, the extent to which the second battery 112 is to be discharged after the battery to be discharged has been switched from the first battery 110 to the second battery 112 may have already been determined at the time of performing operation S240.

According to an example embodiment, the processor 120 may determine intervals to discharge the first battery 110 and the second battery 112 in operation S230 after determining the charge amount of the first battery 110 and the charge amount of the second battery 112 in operation S220. That is, the processor 120 may determine the interval to discharge the second battery 112 as well as the interval to discharge the first battery 110 based on the charge amount of the first battery 110 and the charge amount of the second battery 112.

Figure 3A:
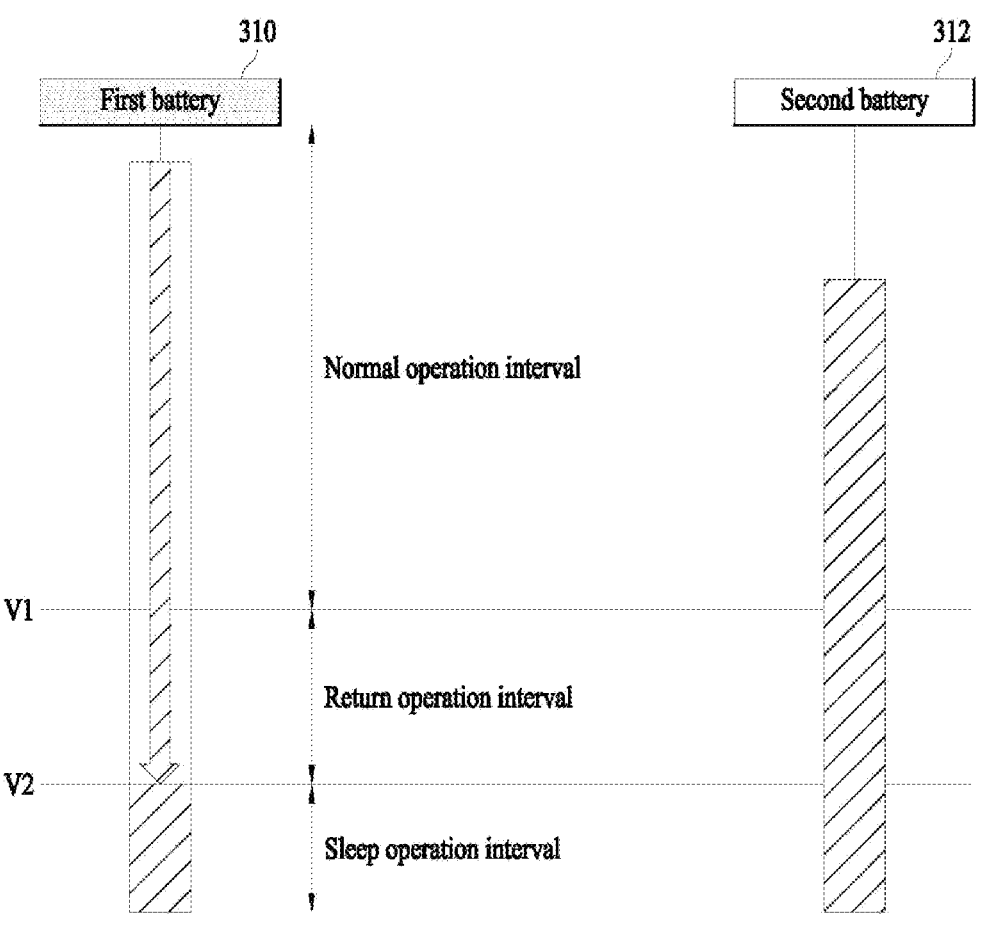
FIGS. 3A and 3B are diagrams illustrating a method for discharging a first battery and a second battery of a mobile robot when the charge amount of the first battery and the charge amount of the second battery fall within a normal operation interval.
Figure 3B:
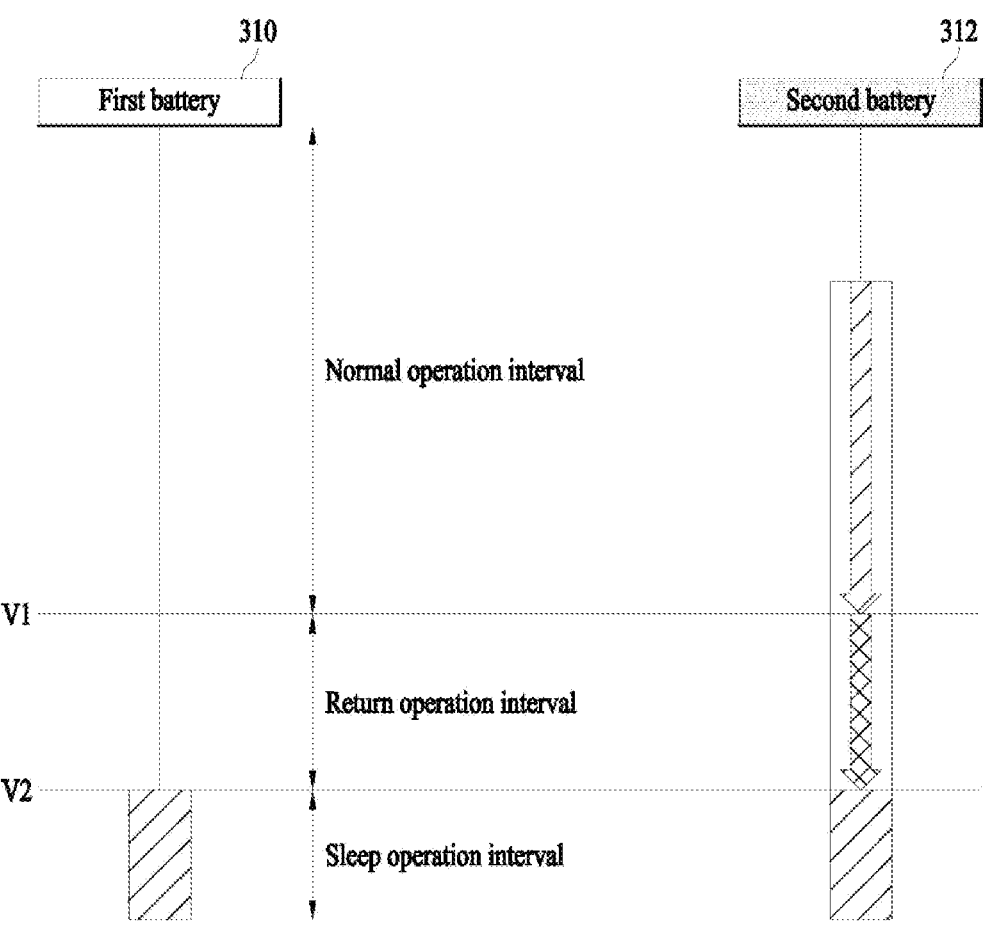

FIGS. 3A and 3B are diagrams illustrating a method for discharging a first battery 310 and a second battery 312 of the mobile robot 100 when the charge amount of the first battery 310 and the charge amount of the second battery 312 are included in the normal operation interval.

According to an example embodiment, the processor 120 may determine which intervals the charge amount of the first battery 310 and the second battery 312 fall within by utilizing a plurality of predetermined intervals based on the charge amount. According to an example embodiment, the plurality of predetermined intervals for determining which intervals the charge amounts of the first battery 310 and the second battery 312 fall within may be determined differently for each of the first battery 310 and the second battery 312. Hereinafter, for convenience of explanation, it will be described on the premise that, same for the first battery 310 and the second battery 312, if the voltage output according to the charge amount is greater than or equal to V1, it is predetermined to fall within the normal operation interval, if it is greater than or equal to V2 and less than V1, it is predetermined to fall within the return operation interval, and if it is less than V2, it is predetermined to fall within the sleep operation interval.

According to an example embodiment, the processor 120 may determine the charge amount of the first battery 310 and the charge amount of the second battery 312, and based on the determination, it may determine which intervals the charge amount of the first battery 310 and the charge amount of the second battery 312 fall within among the plurality of intervals. Referring to FIG. 3A, according to an example embodiment, both the charge amount of the first battery 310 and the charge amount of the second battery 312 may fall within the normal operation interval. According to an example embodiment, the processor 120 may predetermine to discharge the first battery 310 first.

According to an example embodiment, the processor 120 may determine that the charge amount of the first battery 310 falls within the normal operation interval and the charge amount of the second battery 312 falls within the normal operation interval, and based on this, it may determine to discharge the first battery 310 from the normal operation interval to the return operation interval. In this case, the processor 120 may be configured to discharge the first battery 310 in the normal operation interval and the return operation interval while causing the mobile robot 100 to operate in a manner that is performed by the mobile robot 100 in the normal operation interval. That is, if both the charge amount of the first battery 310 and the charge amount of the second battery 312 fall within the normal operation interval at the time the mobile robot 100 starts the operation, the processor 120 may be configured to perform an operation that is performed by the mobile robot 100 in the normal operation interval from the normal operation interval to the return operation interval.

Referring to FIG. 3B, once the charge amount of the first battery 310 has been discharged from the normal operation interval to the return operation interval, the processor 120 may switch the battery to be discharged from the first battery 310 to the second battery 312.

According to an example embodiment, based on the result of the switching operation, the processor 120 may determine to discharge the second battery 312 and further determine to what extent to discharge the second battery 312. According to an example embodiment, the processor 120 may determine that, at the time to begin discharging the second battery 312 (i.e., at the time the switching operation is performed), the charge amount of the first battery 310 falls within the sleep operation interval and the charge amount of the second battery 312 falls within the normal operation interval.

According to an example embodiment, the processor 120 may determine for which interval to discharge the second battery 120 and what operation to perform based on which intervals the charge amount of the first battery 310 and the charge amount of the second battery 312 fall within at the time the discharge of the second battery 120 begins.

Based on that the charge amount of the first battery 310 is included in the sleep operation interval according to the result of discharging the first battery 310 from the normal operation interval to the return discharge interval and that the charge amount of the second battery 312 determined to be discharged according to the switching operation falls within the normal operation interval, according to an example embodiment, the processor 120 may be configured to discharge the second battery 312 from the normal operation interval to the return operation interval, and further configured to perform a normal operation in the normal operation interval and a return operation in the return operation interval. That is, the processor 120 may be configured to cause the mobile robot 100 to perform the normal operation when the first battery 310 is discharged during the return operation interval, while the processor 120 may be configured to cause the mobile robot 100 to perform the return operation when the second battery 312 is discharged during the return operation interval. In accordance with these features, the present disclosure may perform a battery selection process to secure maximum operation time while simultaneously performing an optimized return operation. According to an example embodiment, the mobile robot 100 may secure the time for the normal operation and the return operation as possible by considering the charge amount required for the return operation, so that the return operation of returning to the predetermined location after performing the normal operation may be performed smoothly. According to an example embodiment, the mobile robot 100 may increase the operation and waiting time by consuming the charge of the plurality of batteries as possible before the batteries lose power by switching from a battery that is in use to a battery with a higher output voltage through the switching operation when it is determined to fall within the sleep operation interval.

Figure 4A:
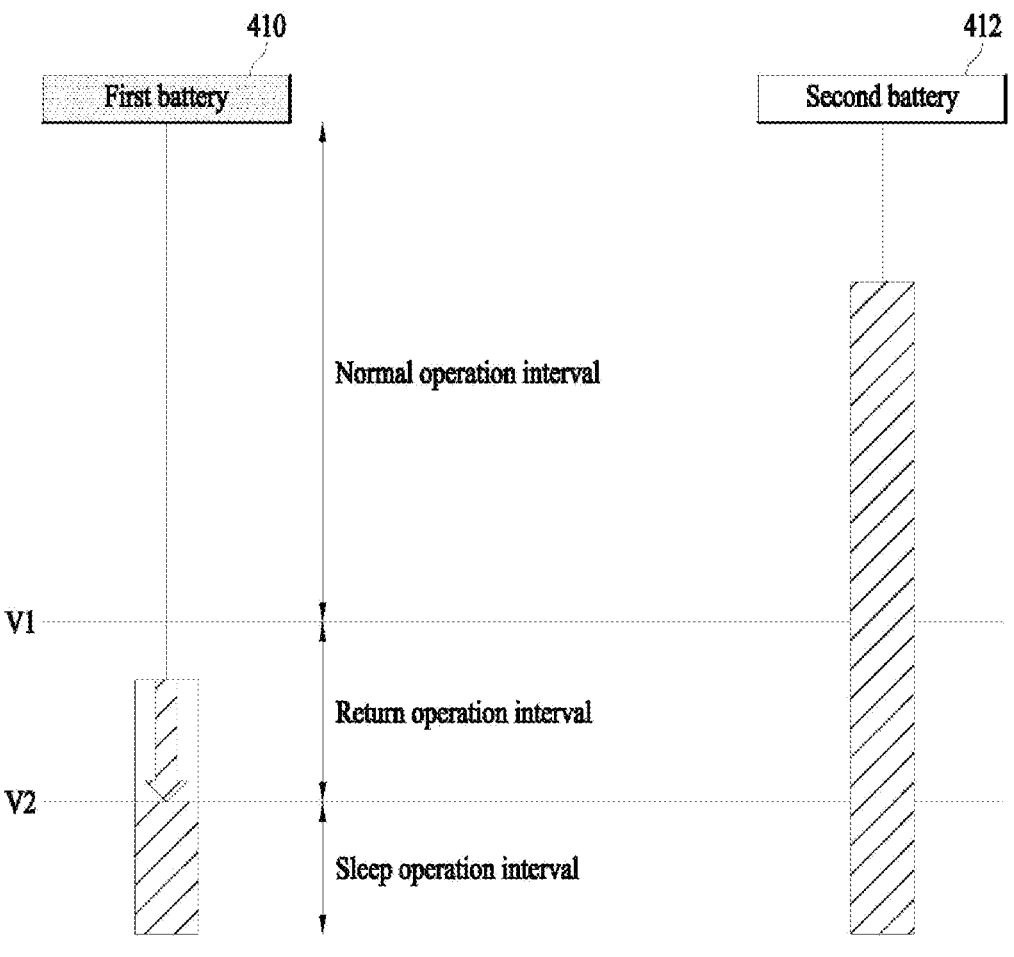
FIG. 4A and FIG. 4B are diagrams illustrating a method for discharging a first battery and a second battery of a mobile robot when the charge amount of the first battery falls within a return operation interval and the charge amount of the second battery falls within a normal operation interval.
Figure 4B:
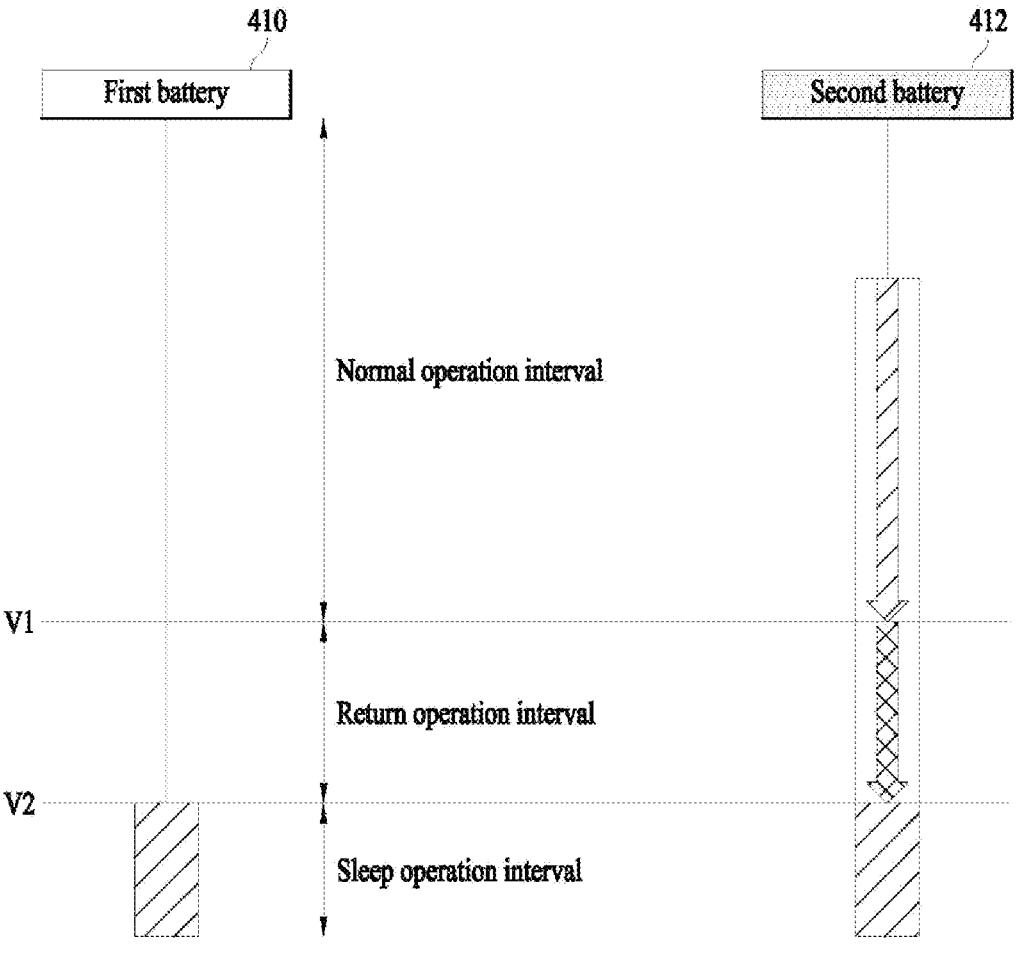

FIG. 4A and FIG. 4B are diagrams illustrating a method for discharging a first battery 410 and a second battery 412 of the mobile robot 100 when the charge amount of the first battery 410 falls within the return operation interval and the charge amount of the second battery 412 falls within the normal operation interval.

Referring to FIG. 4A, according to an example embodiment, the charge amount of the first battery 410 may fall within the return operation interval and the charge amount of the second battery 412 may fall within the normal operation interval. According to an example embodiment, the processor 120 may predetermine to discharge the first battery 410 first.

According to an example embodiment, the processor 120 may determine that the charge amount of the first battery 410 falls within the return operation interval and the charge amount of the second battery 412 falls within the normal operation interval, and based on this, the processor 120 may determine that the first battery 410 is to be discharged in an interval corresponding to the return operation interval. In this case, the processor 120 may be configured to cause the mobile robot 100 to operate in the manner of a normal operation performed by the mobile robot 100 during the normal operation interval, even if the first battery 410 begins to discharge within the return operation interval. That is, the processor 120 may be configured to cause the mobile robot 100 to perform the normal operation to begin with, even if the charge amount of the first battery 410 falls within the return operation interval, when the charge amount of the first battery 410 falls within the return operation interval at the time the mobile robot 100 starts the operation.

According to an example embodiment, the processor 120 may determine which battery to utilize to perform the return operation based on which intervals the charge amount of the first battery 410 and the charge amount of the second battery 412 fall within at the time the first battery 410 starts to discharge. That is, at the time the first battery 410 starts to discharge, if it is determined that the charge amount of the first battery 410 falls within the return operation interval and the charge amount of the second battery 412 falls within the normal operation interval, the processor 120 may be configured to determine to perform the return operation using the second battery 412 and to determine to perform the normal operation using the first battery 410.

Referring to FIG. 4B, once the charge amount of the first battery 410 has been discharged in the return operation interval completely, the processor 120 may switch the battery to be discharged from the first battery 410 to the second battery 412. The method for discharging the second battery 412 when the charge amount of the second battery 412 falls within the normal operation interval has been described above with reference to FIG. 3B, so a detailed description thereof is omitted.

Figure 5A:
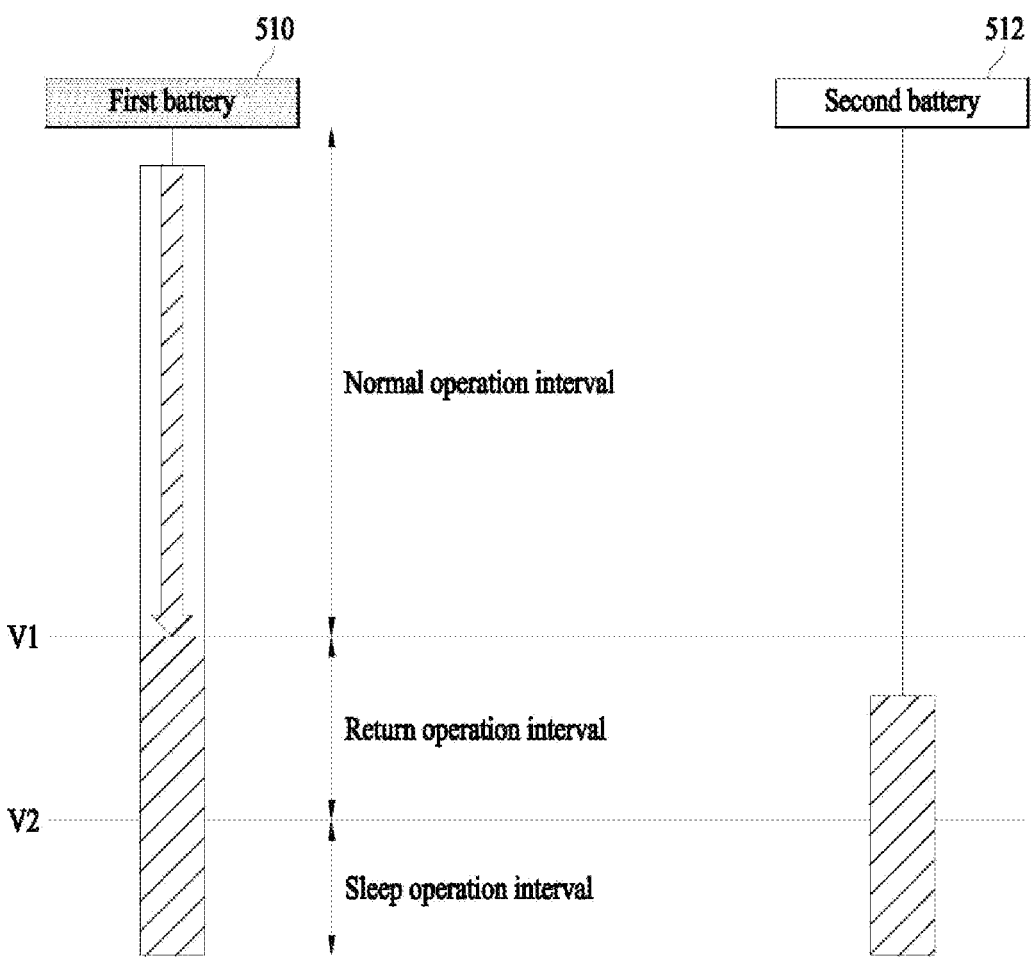
FIGS. 5A to 5C are diagrams illustrating a method for discharging a first battery and a second battery of a mobile robot when the charge amount of the first battery falls within a normal operation interval and the charge amount of the second battery falls within a return operation interval.
Figure 5B:
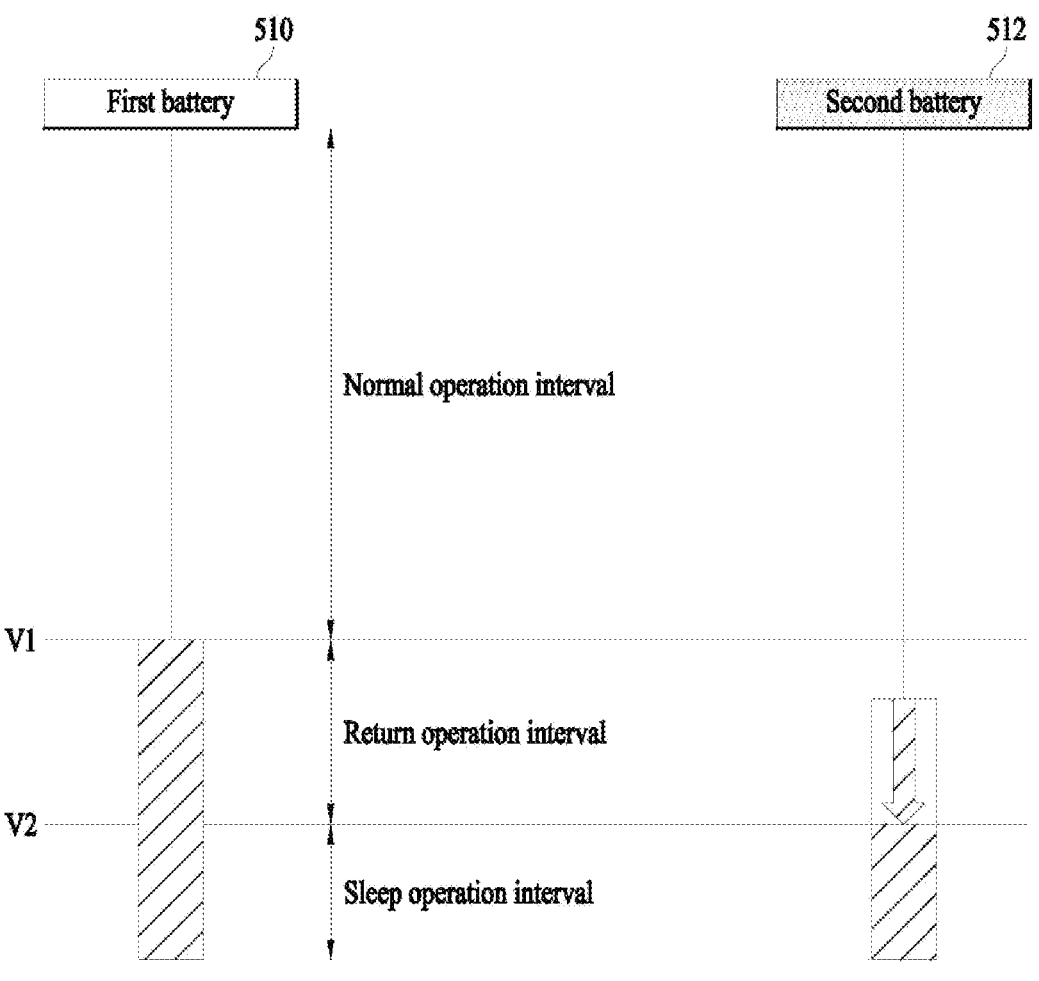
Figure 5C:
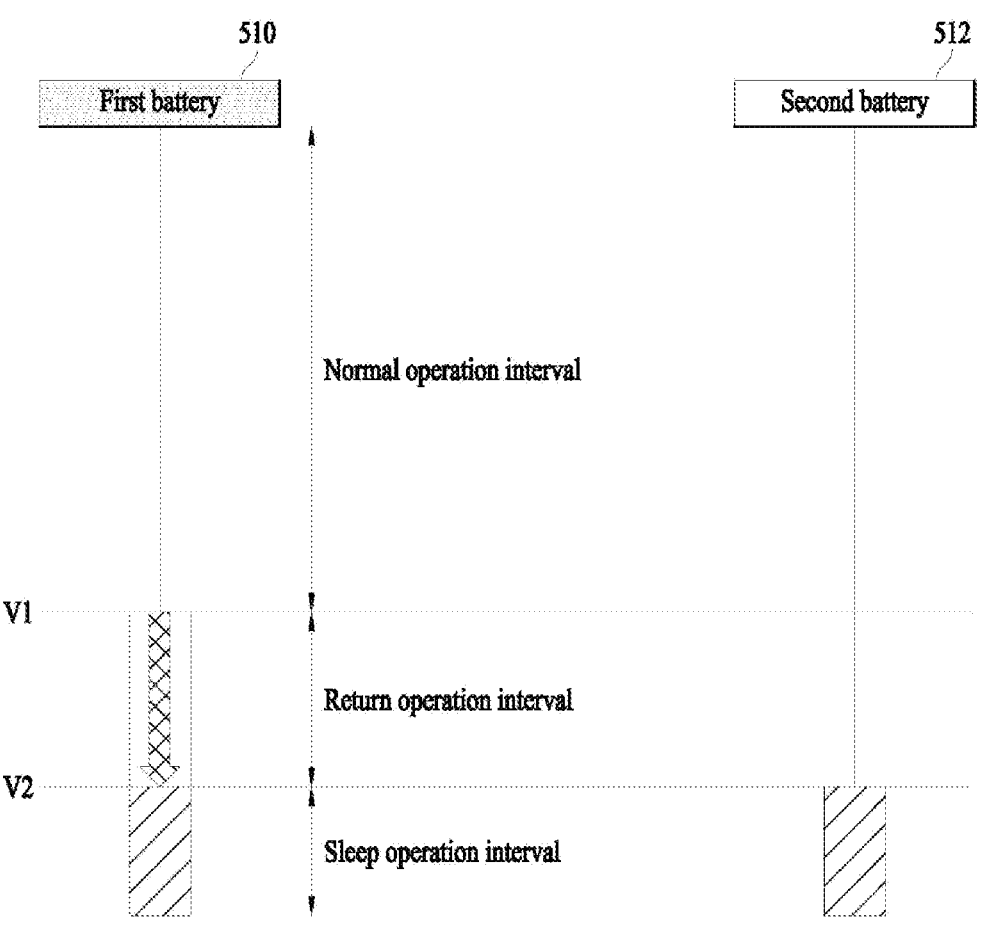

FIGS. 5A to 5C are diagrams illustrating a method for discharging a first battery and a second battery of the mobile robot when the charge amount of the first battery falls within the normal operation interval and the charge amount of the second battery falls within the return operation interval.

Referring to FIG. 5A, according to an example embodiment, the charge amount of the first battery 510 may fall within the normal operation interval and the charge amount of the second battery 512 may fall within the return operation interval. According to an example embodiment, the processor 120 may predetermine to discharge the first battery 510 first.

According to an example embodiment, the processor 120 may determine that the charge amount of the first battery 510 falls within the normal operation interval and the charge amount of the second battery 512 falls within the return operation interval, and based on this, determine that the first battery 510 is to be discharged in an interval corresponding to the normal operation interval. That is, the processor 120 may be configured to cause the mobile robot 100 to operate in a normal operation manner by discharging the first battery 510 only up to the normal operation interval to begin with, even if the charge amount of the first battery 510 falls within the normal operation interval. Thus, at the time the first battery 510 begins to discharge, when it is determined that the charge amount of the second battery 512 falls within the return operation interval even though the charge amount of the first battery 510 falls within the normal operation interval, the processor 120 may determine to perform the return operation using the first battery 512, first discharge the first battery 510 for the normal operation interval, and then switch to the second battery 512.

Referring to FIG. 5B, once the charge amount of the first battery 510 has been discharged in the normal operation interval completely, the processor 120 may switch the battery to be discharged from the first battery 510 to the second battery 512. According to an example embodiment, the processor 120 may determine that the return operation is performed using the first battery 510 to secure the return operation time as possible, and accordingly, the processor 120 may determine that the mobile robot 100 performs the normal operation using the second battery 412, even though the charge amount of the switched second battery 412 falls within the return operation interval.

Referring to FIG. 5C, once the charge amount of the second battery 512 has been discharged in the return operation interval completely, the processor 120 may switch the battery to be discharged back from the second battery 512 to the first battery 510. According to an example embodiment, the first battery 510 that is determined to be discharged as a result of the switching is only discharged to the normal operation interval, as shown in FIG. 5A, and thus the maximum level of charge available for the return operation to be performed is secured. Accordingly, the processor 120 may be configured to utilize the first battery 510 to perform the optimal return operation. This allows the mobile robot 100 to formulate an optimized plan that secures the return operation time as possible to return to a predetermined location after performing the normal operation.

Figure 6:
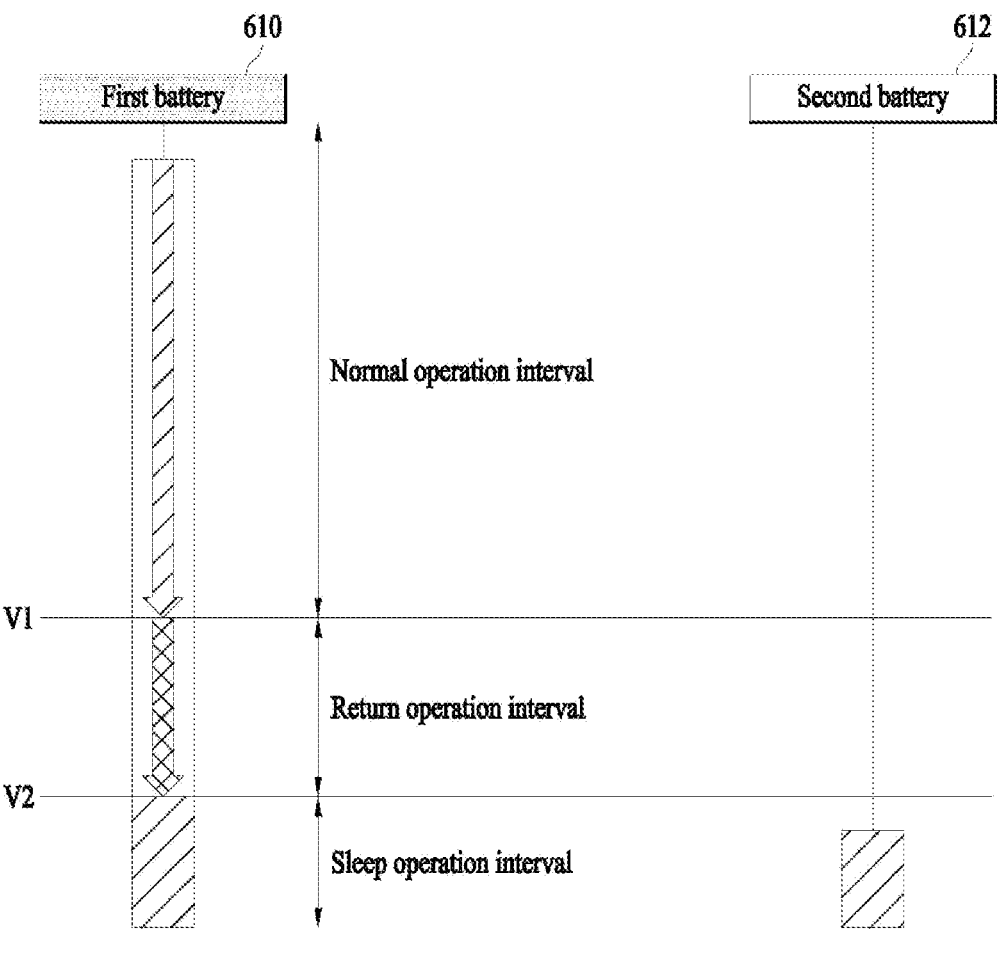
FIGS. 6 and 7 are diagrams illustrating a method for discharging a first battery and a second battery of a mobile robot when the charge amount of the first battery or the second battery is included in a sleep operation interval.
Figure 7:
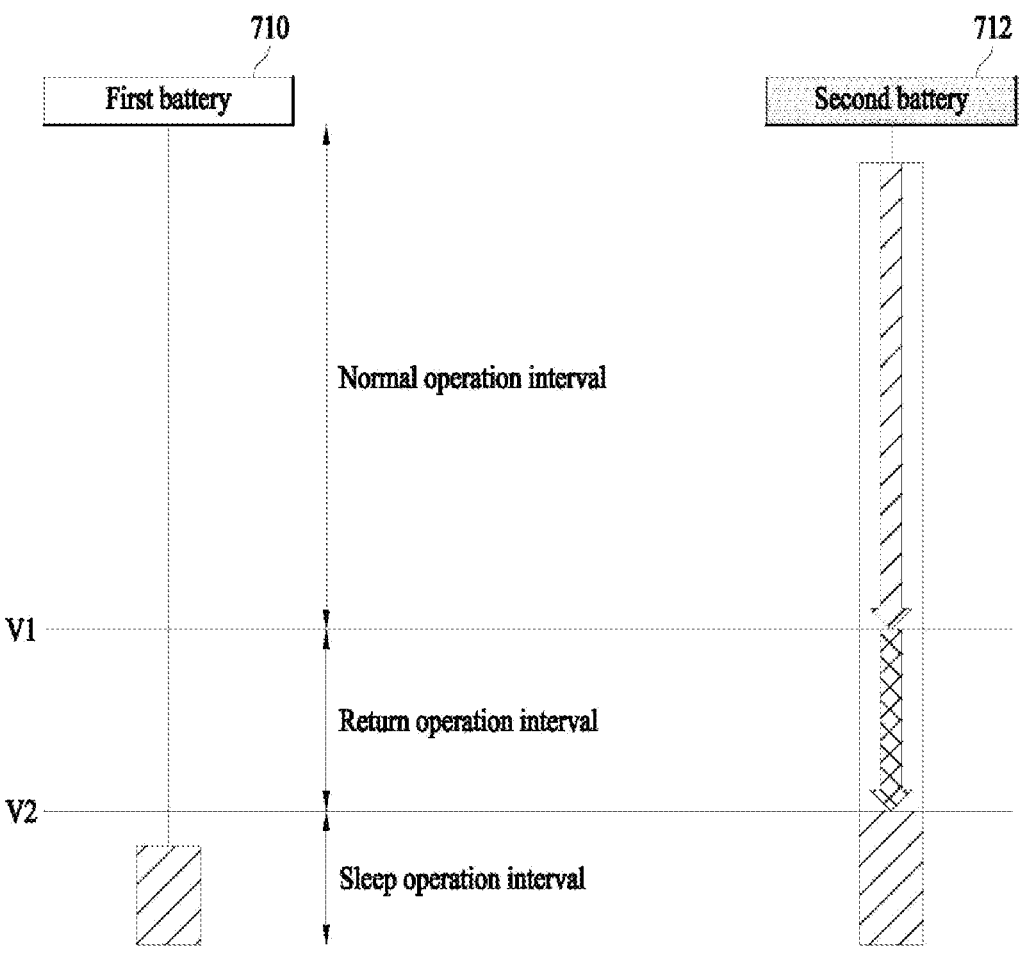

FIGS. 6 and 7 are diagrams illustrating methods for discharging first batteries 610 and 710 and second batteries 612 and 712 of the mobile robot when charge amount the first batteries 610 and 710 or the second batteries 612 and 712 are included in the sleep operation interval, respectively.

According to an example embodiment, if the charge amount of the second battery 612 falls within the sleep operation interval, as shown in FIG. 6, or the charge amount of the first battery 710 falls within the sleep operation interval, as shown in FIG. 7, the processor 120 may establish a discharge plan using the remaining battery.

Referring to FIG. 6, the processor 120 may determine whether to perform the normal operation or the return operation by determining which interval the charge amount of the first battery 610 falls within, according to an example embodiment. According to an example embodiment, if the charge amount of the first battery 610 falls within the normal operation interval, the processor 120 may determine that the mobile robot 100 performs the normal operation while discharging the first battery 610 in the normal operation interval, and if the charge amount of the first battery 610 falls within the return operation interval, the processor 120 may determine that the mobile robot 100 performs the return operation while discharging the first battery 610 in the return operation interval.

Referring to FIG. 7, the processor 120 may determine whether to perform the normal operation or the return operation by determining which interval the charge amount of the second battery 712 falls within, according to an example embodiment. The operation of the processor 120 to control the mobile robot 100 while discharging the second battery 712 may correspond to the discharging process of the first battery 610 described above with reference to FIG. 6, and therefore will not be described in detail.

According to an example embodiment, the processor 120 may be configured to periodically perform a wake-up operation using the first battery 110 or the second battery 112 during the sleep operation interval at predetermined time intervals and perform a switching operation to use the battery having a higher charge amount. Referring to FIG. 7, the processor 120 may predetermine to discharge the first battery 710 first, and the charge amount of the first battery 710 at the time the discharge of the first battery 710 is started may fall within the sleep operation interval. According to an example embodiment, the processor 120 may be configured to perform the sleep operation using the first battery 710 and perform the switching operation to a battery having a higher charge amount (i.e., the second battery 712) thereafter to continue performing the operation using the second battery 712.

Figure 8:
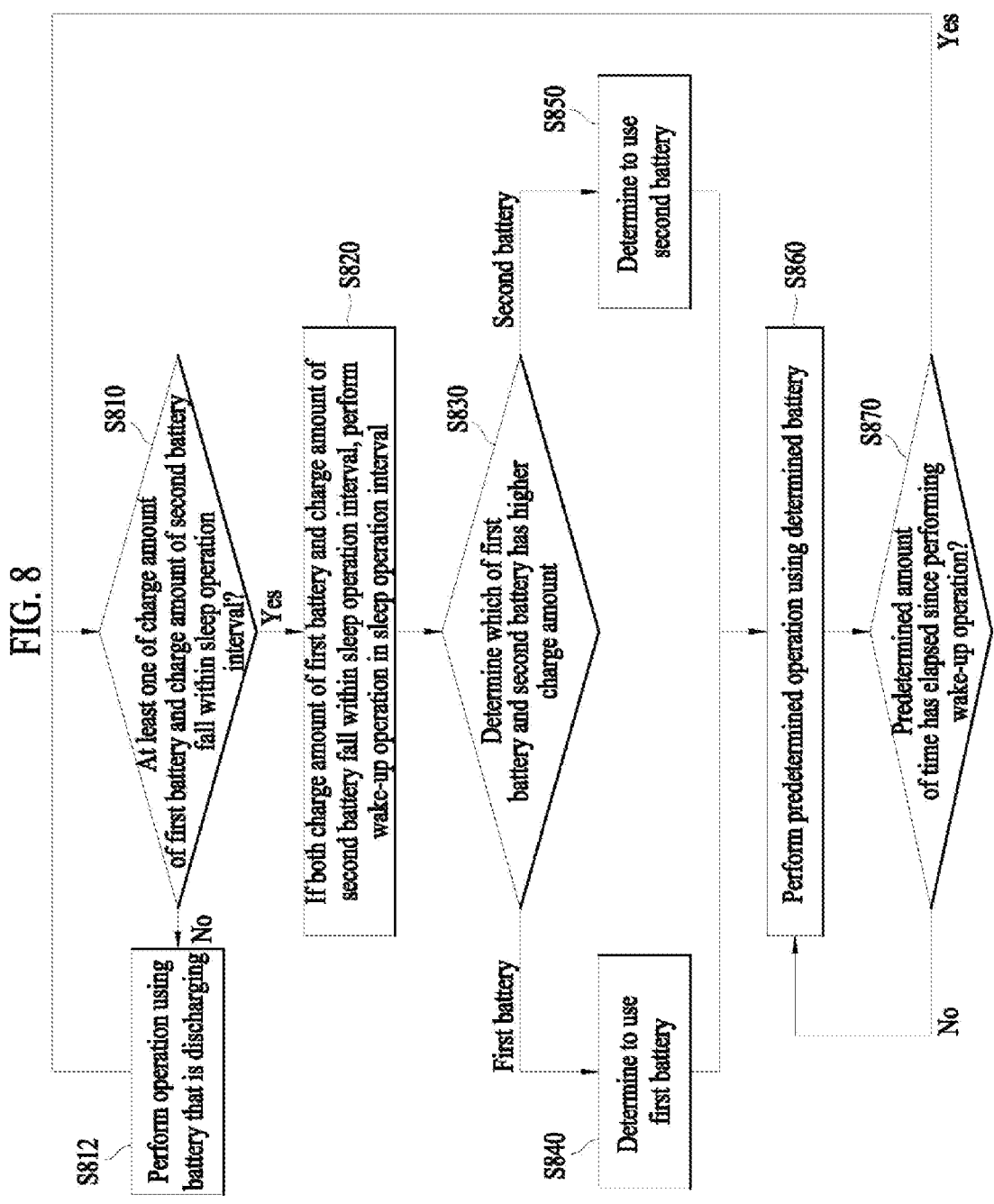
FIG. 8 is a flowchart illustrating a method for discharging a first battery and a second battery of a mobile robot when the charge amount of the first battery and the charge amount of the second battery fall within a sleep operation interval, according to an example embodiment.

FIG. 8 is a flowchart illustrating a method for discharging the first battery 110 and the second battery 112 of the mobile robot 100 when the charge amount of the first battery 110 and the charge amount of the second battery 112 fall within the sleep operation interval, according to an example embodiment. According to an example embodiment, the method illustrated in FIG. 8 may further be performed when starting discharging the first battery 110 or the second battery 112.

According to an example embodiment, the mobile robot 100 may periodically perform the wake-up operation using the first battery 110 or the second battery 112 at predetermined time intervals in the sleep operation interval. According to an example embodiment, if neither the first battery 110 or the second battery 112 has sufficient charge by entering the sleep operation interval, the processor 120 may be configured to perform the wake-up operation at predetermined time intervals and perform the switching operation to use a battery having a higher charge amount than the battery currently in use when the wake-up is performed, if any.

According to an example embodiment, the processor 120 may be configured to cause the mobile robot 100 to operate in a power-saving mode in which the mobile robot 100 may consume minimal power in the sleep operation interval. According to an example embodiment, the processor 120 may be configured to dispatch the current location of the mobile robot 100 during the sleep operation interval. According to an example embodiment, the processor 120 may be configured to only receive data from the mobile robot 100 during the sleep operation interval. According to an example embodiment, the processor 120 may be configured to cut off power to the driver for driving during the sleep operation interval and only enable communication functions. However, the above example embodiments are examples to illustrate that processes may be performed to reduce the power consumed by the mobile robot 100 in the sleep operation interval, and the present disclosure need not be construed as limited to the above example embodiments. Thus, operations that may be performed by the mobile robot 100 in the sleep operation mode may include various operations that may be performed in a conventional power-saving mode.

In operation S810, the processor 120 may determine whether the charge amount of the first battery 110 and the charge amount of the second battery 112 fall within the sleep operation interval, according to an example embodiment.

If the charge amount of the first battery 110 and the charge amount of the second battery 112 do not both fall within the sleep operation interval, according to an example embodiment, the processor 120 may determine in operation S812 that the mobile robot 100 continues to perform the operation using whichever of the first battery 110 or the second battery 112 is discharging.

If both the charge amount of the first battery 110 and the charge amount of the second battery 112 fall within the sleep operation interval, according to an example embodiment, the processor 120 may perform the wake-up operation in the sleep operation interval, in operation S820. When the wake-up operation is performed according to an example embodiment, the processor 120 performs a switching operation between a plurality of batteries including the first battery 110 and the second battery 112.

In operation S830, the processor 120 may determine which of the first battery 110 and the second battery 112 has a higher charge amount, according to an example embodiment. According to an example embodiment, the processor 120 may determine which of the plurality of batteries included in the mobile robot 100 has the highest charge amount. According to an example embodiment, the process of determining the battery with the highest charge amount may be performed for the plurality of batteries whose charge amount falls within the sleep operation interval.

According to an example embodiment, the processor 120 determines to use the first battery 110 if the first battery 110 has a higher charge amount than the second battery 112 (operation S840), and determines to use the second battery 112 if the second battery 112 has a higher charge amount than the first battery 110 (operation S850).

According to an example embodiment, the processor 120 may not perform the switching operation of the batteries if it is determined that the battery already in use has a higher charge amount than the other battery.

In operation S860, the processor 120 may determine that the mobile robot 100 performs a predetermined operation using the battery determined in operation S840 or operation S850, according to an example embodiment. The predetermined operation to be performed in operation S860, according to an example embodiment, may include various operations that the mobile robot 100 may perform in the sleep operation mode, such as various conventional operations that may be performed in the power-saving mode.

In operation S870, the processor 120 may determine whether a predetermined amount of time has elapsed since performing the wake-up operation. According to an example embodiment, the predetermined amount of time may be a predetermined time for periodically performing the wake-up operation, which may be a time set by a user.

According to an example embodiment, if it is determined that a predetermined amount of time has elapsed since performing the wake-up operation, the processor 120 may perform operation S810 again.

If it is determined that the predetermined amount of time has elapsed since performing the wake-up operation, according to an example embodiment, the processor 120 may further determine whether the charge amounts of the first battery 110 and the second battery 112 fall within the sleep operation interval. According to an example embodiment, if it is determined that the predetermined amount of time has elapsed but the charge amount of at least one of the first battery 110 and the second battery 112 does not fall within the sleep operation interval (e.g., if a charging process has caused the charge amount of at least one of the first battery 110 and the second battery 112 to fall within the normal operation interval or the return operation interval), the processor 120 may determine to perform the normal operation or the return operation while discharging in an interval with a charge amount rather than that for the sleep operation.

According to an example embodiment, if it is determined that the predetermined amount of time has not yet elapsed since performing the wake-up operation, the processor 120 may perform operation S860 again.

According to an example embodiment, the mobile robot 100 may further include a computer-readable recording medium or memory (not illustrated) for recording programs for performing the various methods described above. The method performed according to the present disclosure described above may be provided by being recorded in a computer-readable recording medium as a program for execution by a computer.

The method of the present disclosure may be executed through software. When executed in software, the component parts of the present disclosure are code segments which perform necessary tasks. The program or the code segments may be stored on a processor-readable medium.

The computer-readable recording medium includes all kinds of recording devices in which data readable by a computer system is stored. Examples of the computer-readable recording device include a read only memory (ROM), a random access memory (RAM), a compact disc (CD)-ROM, a digital versatile disc (DVD)±ROM, DVD-RAM, a magnetic tape, a floppy disk, a hard disk, and an optical data storage device. The computer-readable recording medium may also be distributed in a computer device connected via a network so that a computer-readable code may be stored and executed in a distributed manner.

The above-described present disclosure may be variously substituted, modified, and changed within the technical spirit of the present disclosure without departing from the scope by those skilled in the art to which the present disclosure pertains and is not limited to the above-described example embodiments and the accompanying drawings. In addition, the example embodiments described herein may not be limitedly applied and all or some of each embodiment may be selectively combined so that various modifications may be made.

For those of ordinary skill in the art to which the present disclosure pertains, various substitutions, modifications and changes are possible within the scope of the example embodiments without departing from the technical spirit of the example embodiment. Thus, the present disclosure is not limited to the above-described example embodiments and the accompanying drawings.

The invention claimed is:

1. A method for discharging a first battery and a second battery included in a mobile robot, the method comprising:

determining that the mobile robot is to begin driving;

determining which of a plurality of predetermined intervals a charge amount of the first battery and a charge amount of the second battery at a time point of the determination fall within, respectively;

determining an interval to discharge the first battery based on which intervals the charge amount of the first battery and the charge amount of the second battery fall within; and performing a switching operation to begin discharging of the second battery after the first battery has completed discharging in the determined interval, wherein the plurality of predetermined intervals comprises a normal operation interval, a return operation interval corresponding to a charge amount to return to a predetermined location, and a sleep operation interval, and wherein the determining of the interval comprises determining to discharge the first battery in the normal operation interval when the charge amount of the second battery falls within the normal operation interval or the return operation interval.

2. The method of claim 1, wherein the first battery is a battery predetermined to be discharged first.

3. The method of claim 1, wherein the predetermined location is a location where at least one of the first battery or the second battery was charged, and wherein the mobile robot periodically performs, in the sleep operation interval, a wake-up operation using the first battery or the second battery according to a predetermined time interval and the switching operation to use a battery having a higher charge amount.

4. The method of claim 3, wherein the determining which of the plurality of predetermined intervals the charge amount of the first battery and the charge amount of the second battery at the time point of the determination fall within, respectively, comprises:

determining that the first battery or the second battery falls within the normal operation interval when a voltage output of the first battery or the second battery is greater than a first voltage;

determining that the first battery or the second battery falls within the return operation interval when the voltage output of the first battery or the second battery is less than or equal to the first voltage and greater than a second voltage which is less than the first voltage; and determining that the first battery or the second battery falls within the sleep operation interval when the voltage output of the first battery or the second battery is less than or equal to the second voltage.

5. The method of claim 3, wherein the determining of the interval to discharge the first battery comprises determining to discharge the first battery in the normal operation interval and the return operation interval when both the charge amount of the first battery and the charge amount of the second battery fall within the normal operation interval.

6. The method of claim 3, wherein the determining of the interval to discharge the first battery comprises determining to discharge the first battery in the normal operation interval when the charge amount of the first battery falls within the normal operation interval and the charge amount of the second battery falls within the return operation interval.

7. The method of claim 3, wherein the determining of the interval to discharge the first battery comprises determining to discharge the first battery in the return operation interval when the charge amount of the first battery falls within the return operation interval.

8. The method of claim 5, further comprising determining to discharge until the charge amount of the second battery falls within the sleep operation interval.

9. The method of claim 8, further comprising:

periodically performing the wake-up operation at predetermined time intervals in the sleep operation interval when the charge amount of the first battery and the charge amount of the second battery fall within the sleep operation interval;

determining which of the first battery and the second battery has a higher charge amount for each wake-up operation; and determining to use the battery determined to have a higher charge amount.

10. The method of claim 3, wherein the determining of which of the plurality of predetermined intervals comprises determining a battery to be used to perform a return operation for the mobile robot to return to a predetermined location based on which interval the charge amount of the first battery and the charge amount of the second battery fall within.

11. The method of claim 10, wherein the determining of the battery to be used to perform the return operation comprises determining the second battery as the battery to be used to perform the return operation when both the charge amount of the first battery and the charge amount of the second battery fall within the normal operation interval.

12. The method of claim 10, wherein the determining of the battery to be used to perform the return operation comprises determining the first battery as the battery to be used to perform the return operation when the charge amount of the first battery falls within the normal operation interval and the charge amount of the second battery falls within the return operation interval.

13. The method of claim 10, wherein the determining of the battery to be used to perform the return operation comprises determining the second battery as the battery to be used to perform the return operation when the charge amount of the first battery falls within the return operation interval.

14. A mobile robot, comprising:

a first battery;

a second battery; and a processor configured to:

determine that the mobile robot is to begin driving;

determine which of a plurality of predetermined intervals a charge amount of the first battery and a charge amount of the second battery at a time point of the determination fall within, respectively;

determine an interval to discharge the first battery based on which intervals the charge amount of the first battery and the charge amount of the second battery fall within; and perform a switching operation to begin discharging of the second battery after the first battery has completed discharging in the determined interval, wherein the plurality of predetermined intervals comprises a normal operation interval, a return operation interval corresponding to a charge amount to return to a predetermined location, and a sleep operation interval, and wherein the processor is configured to determine to discharge the first battery in the normal operation interval when the charge amount of the second battery falls within the normal operation interval or the return operation interval.

15. The mobile robot of claim 14, wherein the processor is configured to determine to discharge the first battery first.

16. The mobile robot of claim 14, the predetermined location is a location where at least one of the first battery or the second battery was charged, and wherein the processor is configured to periodically perform, in the sleep operation interval, a wake-up operation using the first battery or the second battery according to a predetermined time interval and the switching operation to use a battery having a higher charge amount.

17. The mobile robot of claim 16, wherein the processor is configured to determine to discharge the first battery in the normal operation interval and the return operation interval when both the charge amount of the first battery and the charge amount of the second battery fall within the normal operation interval.

18. The mobile robot of claim 16, wherein the processor is configured to determine to discharge the first battery in the normal operation interval when the charge amount of the first battery falls within the normal operation interval and the charge amount of the second battery falls within the return operation interval.

19. The mobile robot of claim 16, wherein the processor is configured to determine to discharge the first battery in the return operation interval when the charge amount of the first battery falls within the return operation interval.

20. A non-transitory computer-readable recording medium having a computer program for executing the method of claim 1 stored thereon.

* * * * *